UNITED STATES PATENT OFFICE.

WOOLSEY McA. JOHNSON, OF HARTFORD, CONNECTICUT, ASSIGNOR TO THE CONTINUOUS ZINC FURNACE COMPANY, OF HARTFORD, CONNECTICUT, A CORPORATION OF CONNECTICUT.

ELECTRIC REDUCTION OF ZINC ORES.

1,150,271.   Specification of Letters Patent.   Patented Aug. 17, 1915.

No Drawing.   Application filed October 17, 1912. Serial No. 726,254.

*To all whom it may concern:*

Be it known that I, WOOLSEY McA. JOHNSON, a citizen of the United States, residing at Hartford, county of Hartford, State of Connecticut, have invented certain new and useful Improvements in Electric Reduction of Zinc Ores; and I do hereby declare the following to be a full, clear, and exact description of the invention, such as will enable others skilled in the art to which it appertains to make and use the same.

My invention is based upon the discovery that, in the reduction of zinc ores in the electric furnace, the presence of sulfur, either in a free state, or in the form of carbon disulfid, sulfur dioxid or sulfur trioxid, is, under ordinary conditions, accompanied by a partial sulfidization of the zinc vapors, with the resultant formation of a superficial coating upon some of the condensing globules, so that the globules thus sulfidized are prevented from coalescing to liquid zinc. The superficial coating referred to is a coating of zinc sulfid, and the globules thus coated may conveniently be designated as "sulfidized chemical" blue powder, in contradistinction either to blue powder having a superficial oxidization or whose production is caused principally by improper physical conditions.

The purpose of my invention is to eliminate, as far as possible, the sulfidization of the zinc vapor to be condensed, so as to proportionately increase the percentage of metal condensable directly to spelter; in other words, to produce, in the electric smelting of complex zinc ores, a gas substantially free from such sulfur impurities as would prevent the easy condensation of the zinc vapor to liquid zinc.

In carrying out my invention, I precede the reduction of the zinc in the electric furnace, by a preliminary calcining operation, so conducted that the residual sulfur is reduced to a desired minimum and also that the sulfates other than the sulfates of lead, calcium and barium (which are not decomposable at 1000° C.) are substantially decomposed. The calcined product is then mixed with reducing agents and fluxes and is treated, under such conditions, in a preheater, so as to reduce the sulfates present into sulfids and to reduce, or partially reduce, the iron oxids and copper oxids present. The final reduction of the zinc oxid and zinc sulfid is effected in the electric furnace, with the production of sulfids and sub-sulfids of iron and copper, which are absorbed by the matte.

In the practice of my invention, I prefer to so proportion the ores entering into the charge that the calcined or roasted product shall analyze typically 30% Zn, 10% Pb, 2% Cu, 15% Fe, 8% $SiO_2$, 4% CaO, 1% MgO, 3% S. The calcining or roasting operation should be conducted at such a temperature (say, about 950° C.) and under such conditions that the residual sulfur is reduced to the desired minimum, and also that the sulfates other than $PbSO_4$, $CaSO_4$ and $BaSO_4$ are substantially decomposed. Another reason for maintaining the temperature of the calcining or roasting operation below 1,000° C. is to increase the reducibility of the charge, by preventing incipient slagging in the calcining or roasting operation and a physico-chemical hardening of the reducible oxids.

The hot calcined product from the roasting operation is intimately mixed with 15% to 20% of soft coal, sufficient for the ultimate reduction of the oxids. The fluxes desirable for the final treatment in the electric furnace may also be added to the charge, at this stage of the operation. The mixture is then charged directly into a preheater furnace which is preferably of the continuously operated coal-fired or gas-fired type, as, for instance, of the well known McDougall type employed for chloridizing copper ores, although other types of mechanically operated, indirectly heated, roasting furnaces, familiar to the art, may be used for the preheating.

In the pre-heating furnace, the $PbSO_4$, $CaSO_4$, $BaSO_4$, $Fe_2O_3$, CuO are reduced to PbS, CaS, BaS, Fe and sub-oxid thereof, and Cu and the temperature should be restricted to such a range that there ordinarily shall take place no such primary reduction of ZnO as would be evidenced by the appearance of zinc vapor in the pre-heater. The reduction by the carbon of the soft coal, may be supplemented, in whole or in part, by reduction by suitable gases, such as hydrogen or carbon monoxid, admitted, for instance, in the form of water-gas, or otherwise. So, also, the reduction may be effected in whole or in part by hydrocarbons.

In the pre-heater, the hydrocarbons of the coal are driven off. The hot product from the pre-heater is then charged, without access to the air, into an electric smelting furnace, preferably of the continuously acting type shown in Letters Patent of the United States granted to me under date of July 12, 1910, No. 964,268.

In the electric furnace, the zinc oxid present in the charge is reduced in part by the carbon of the coal, in accordance with the equation:

$$ZnO + C = Zn + CO$$

The iron and copper present in the charge react therein, in large part, as follows:

$$ZnO + Fe = Zn + FeO$$
$$ZnS + Fe = Zn + FeS$$
$$ZnS + Cu_2 = Zn + Cu_2S$$

These reactions proceed in the charge and in the slag. The FeO is absorbed by the slag. The sulfids of iron and copper are absorbed by the matte. PbS is reduced to Pb by the iron or partially by the copper. The sulfur of the BaS and CaS is taken up by the Fe and Cu, forming sulfids of iron and copper which are absorbed by the matte, and the Ba and Ca finally enter the slag as silicates of barium and calcium.

The charge should be so proportioned, as in the typical instance hereinbefore given, that the percentage of Fe and Cu shall be from 5 to 7 times that of the sulfur. Inasmuch as for the formation of monosulfids of Fe and Cu the ratio of S to Fe and Cu requisite is only about 2, sub-sulfids are formed. The amount of FeO that enters the slag can be controlled by the amount of carbon mixed with the charge, and also by so working the preheater that a larger or smaller proportion of $CO_2$ is produced therein.

It will be noted, in accordance with the foregoing description of the reactions proceeding in the electric furnace, that a large excess of metallic particles is continuously descending through the charge and slag into the matte. These metallic particles effect a desulfidization of the vapor, the charge, the slag, and finally enter the matte as metallic sulfids or sub-sulfids. The resultant effect is that as the zinc vapor leaves the smelting furnace, sulfuridization of the zinc vapor is prevented, so that it passes on to the condenser in such condition that its condensing globules will coalesce to liquid zinc, without the formation of "sulfidized chemical" blue powder hereinbefore referred to. The formation of "oxidized chemical" blue powder may be avoided by passing the vapors through a deoxidizing body of carbon, interposed in the course of the vapors on their passage to the condenser.

During the progress of the operation as conducted in the electric furnace, the formation of sulfur or of sulfidizing gases may be brought about by various other reactions than those which have been hereinbefore considered. For instance, if the matte should be overheated, its vapor tension with respect to sulfur might increase to such an extent that sulfur would be given off from the matte. So, also, if the furnace should be operated at a temperature as high as 1350° C., or 1400° C., the following reactions would occur:

$$ZnS + C \rightleftharpoons Zn + CS_2;$$

reversing in a cooler part of the furnace or on the way to the condenser, with the formation of soot-like carbon and a flocculent ZnS which choke the condenser. So, also, any unreduced sulfate present in the charge will evolve a mixture of $SO_2$ and $SO_3$, which would cause an oxidizing as well as a sulfidizing of the zinc vapor. In all of these several reactions, the net practical effect would be to reduce to a non-commercial proportion the percentage of metal condensed direct to spelter and to produce an unmanageably large amount of blue powder.

By the process herein described, however, effective desulfurization is continuously progressive, either directly, in solid or liquid phases, as $$ZnS + Fe = Zn + FeS;$$

or, indirectly, as $$S \text{ (or S compounds)} + Fe = FeS,$$

in gaseous phase, and in liquid phase, $$FeS + Fe = Fe_2S$$

(i. e., metallic iron dissolved in FeS).

Having thus described my invention, what I claim is:—

1. In the electric reduction of complex zinc ores, including in their analysis sulfur, lead, and calcium or barium, preliminarily calcining said ores to the substantial elimination of sulfates with the exception of sulfate of lead and such sulfates of calcium and barium as are present, and then reducing the residual sulfates to sulfids; substantially as described.

2. In the electric reduction of calcined complex zinc ores, the method of avoiding sulfidization of the zinc vapors produced, which consists in reducing to sulfids substantially all of the sulfates present in the calcined ore and electrically reducing the zinc compounds thereafter; substantially as described.

3. In the electric reduction of calcined complex zinc ores, the method of avoiding sulfidization of the zinc vapors produced, which consists in reducing to sulfids substantially all of the sulfates present in the calcined ore, likewise reducing any copper present to metallic form and any $Fe_2O_3$ present into the form of Fe and sub-oxid thereof, and electrically reducing the zinc compounds thereafter; substantially as described.

4. The method of producing a condensable metallic vapor, in the reduction of a furnace charge containing sulfur, which consists in forming an excess of nascent nonvolatile metal and utilizing the same, desulfurizing the gas emanating from the operation and carrying off the metallic vapor while the metallic vapor is at a temperature above its condensing point; substantially as described.

5. The method of producing a condensable metallic vapor in the reduction of a furnace charge containing sulfur, which consists in forming an excess of nascent nonvolatile metal and utilizing the same, desulfurizing and deoxidizing the gas emanating from the operation and carrying off the metallic vapor while the metallic vapor is at a temperature above its condensing point; substantially as described.

In testimony whereof I affix my signature in presence of two witnesses.

WOOLSEY McA. JOHNSON.

Witnesses:
M. A. BILL,
E. C. RYDER.